United States Patent
Gurumani et al.

(10) Patent No.: US 10,097,259 B2
(45) Date of Patent: Oct. 9, 2018

(54) SATELLITE RECEIVER DOPPLER COMPENSATION USING RESAMPLED SATELLITE SIGNALS

(71) Applicant: Hughes Network Systems, LLC, Germantown, MD (US)

(72) Inventors: Santharam Gurumani, Frederick, MD (US); Seokho Kim, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 767 days.

(21) Appl. No.: 14/587,193

(22) Filed: Dec. 31, 2014

(65) Prior Publication Data

US 2016/0187489 A1    Jun. 30, 2016

(51) Int. Cl.
    *H04B 7/185*    (2006.01)
(52) U.S. Cl.
    CPC ......... *H04B 7/18515* (2013.01); *H04B 7/185* (2013.01)
(58) Field of Classification Search
    CPC ...................................... H04B 7/185–7/18597
    USPC ......... 455/3.02, 12.1, 13.1, 13.2, 13.3, 13.4; 342/357.65; 375/316
    See application file for complete search history.

(56) References Cited

U.S. PATENT DOCUMENTS

| | | | |
|---|---|---|---|
| 5,781,543 A | 7/1998 | Ault et al. | |
| 5,828,957 A | 10/1998 | Kroeger et al. | |
| 6,407,699 B1 * | 6/2002 | Yang | G01S 19/21 342/357.59 |
| 6,724,847 B1 * | 4/2004 | Kallman | H04L 7/0029 329/345 |
| 6,795,489 B2 | 9/2004 | Joshi et al. | |
| 2009/0322599 A1 * | 12/2009 | Sun | G01S 19/24 342/357.69 |

FOREIGN PATENT DOCUMENTS

WO    2007115329    10/2007

* cited by examiner

*Primary Examiner* — Philip Sobutka
(74) *Attorney, Agent, or Firm* — Bejin Bieneman PLC

(57) ABSTRACT

A telecommunications system includes a satellite receiver programmed to estimate a Doppler frequency associated with a satellite signal. Estimating the Doppler frequency includes sampling the satellite signal, resampling the sampled satellite signal, and compensating for a frequency offset associated with the satellite signal. An example satellite receiver includes a sampling device programmed to sample the satellite signal, a resampling device programmed to sample the sampled satellite signal and output a resampled satellite signal, and an incremental phase modulator programmed to filter a frequency offset from the resampled satellite signal.

20 Claims, 3 Drawing Sheets

SATELLITE RECEIVER DOPPLER COMPENSATION USING RESAMPLED SATELLITE SIGNALS

BACKGROUND

Satellites in telecommunications systems can use different types of orbits. Example orbits include geostationary orbits, Molniya orbits, elliptical orbits, and low Earth orbits. Satellites in low Earth orbit typically travel at an altitude between 160 km and 2,000 km above the Earth's surface. Satellites in low Earth orbit are not necessarily geosynchronous. Therefore, the satellite moves relative to a stationary receiver located near the Earth's surface. The movement of the satellite, either toward or away from the stationary receiver, creates a Doppler effect.

DETAILED DESCRIPTION

Ignoring the Doppler effect caused by the movement of a satellite relative to a stationary receiver near the surface of the Earth can be problematic, especially in the context of providing high quality media content. More accurate signal processing contributes to a higher quality video and audio output. Therefore, failing to compensate for the Doppler effect can result in poor quality video and audio.

A telecommunications system that can more accurately compensate for the Doppler effect includes a satellite receiver programmed to estimate a Doppler frequency associated with a satellite signal. Estimating the Doppler frequency includes initially sampling the satellite signal, resampling the sampled satellite signal, and compensating for a frequency offset associated with the satellite signal. An example satellite receiver includes a sampling device programmed to initially sample the satellite signal, a resampling device programmed to sample the sampled satellite signal and output a resampled satellite signal, and an incremental phase modulator programmed to filter a frequency offset from the resampled satellite signal.

The elements shown may take many different forms and include multiple and/or alternate components and facilities. The example components illustrated are not intended to be limiting. Indeed, additional or alternative components and/or implementations may be used.

Figure 1:
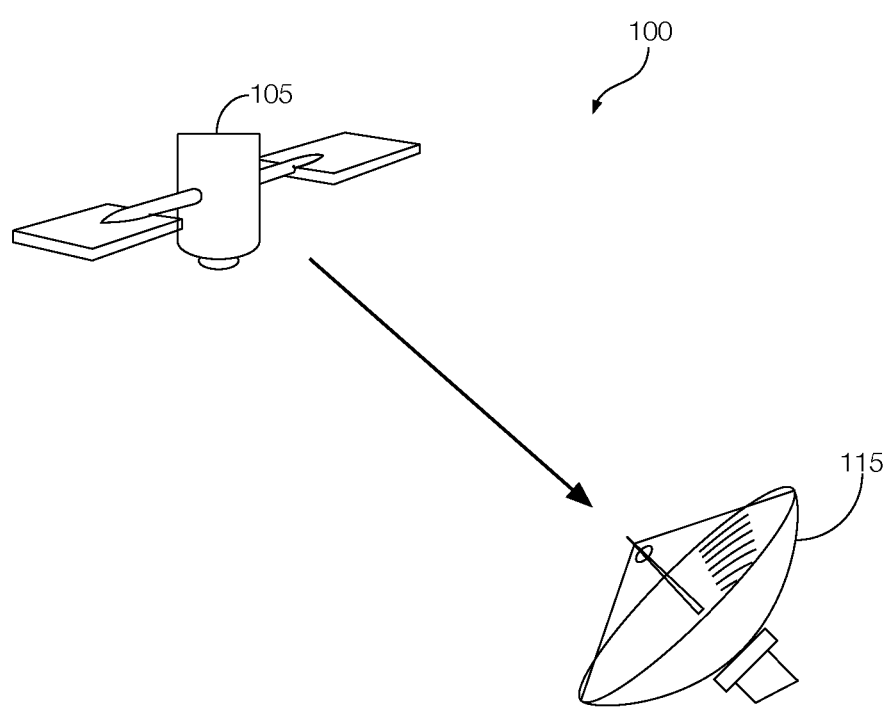
FIG. 1 illustrates an example telecommunications system including a satellite that moves relative to a receiver located on or near the surface of the Earth.

As illustrated in FIG. 1, the telecommunications system 100 includes a satellite 105 and a satellite receiver 110.

The satellite 105 may include any device in orbit relative to the Earth and configured or programmed to receive and transmit signals. The satellite 105, therefore, may broadcast satellite signals to the satellite receiver 110. The satellite signals may be transmitted in accordance with any number of communication protocols or standards including, but not limited to, the code division multiple access (CDMA) standard. The orbit may include a geosynchronous orbit or a non-geosynchronous orbit. One example of a non-geosynchronous orbit may include, e.g., a low Earth orbit.

The satellite receiver 110 may include a satellite dish configured or programmed to receive satellite signals transmitted from the satellite 105 in orbit around the Earth. The satellite receiver 110 may be further programmed to estimate a Doppler frequency associated with the received satellite signals. As discussed in greater detail below, estimating the Doppler frequency may include initially sampling the satellite signal, resampling the sampled satellite signal, and compensating for a frequency offset associated with the satellite signal.

The satellite receiver 110 may be programmed to resample the satellite signal according to a predetermined chip rate. In one possible approach, resampling the satellite signal may include reducing the chip rate from a first chip rate to a second chip rate. The satellite signal may be initially sampled at, e.g., eight times the chip rate and resampled at, e.g., two times the chip rate. Therefore, the first chip rate may be at least four times greater than the second chip rate. The satellite signal may be sampled and resampled at other rates.

After the satellite signal has been resampled, the satellite receiver 110 may be programmed to filter the resampled satellite signal. Filtering the resampled satellite signal may compensate for the frequency offset. Thus, the satellite receiver 110 may generate a filtered satellite signal. The filtered satellite signal may be processed to, e.g., estimate the Doppler frequency associated with the original satellite signal received from the satellite 105. The satellite receiver 110 may be programmed to compensate for the Doppler frequency of the satellite signal using the estimated Doppler frequency. In the context of providing media content, by compensating for the Doppler frequency, the satellite receiver 110 may be used to provide higher quality signals to, e.g., a set top box or other media content processing device. In turn, the set top box or other media content processing device can output higher quality video and audio signals.

Figure 2:
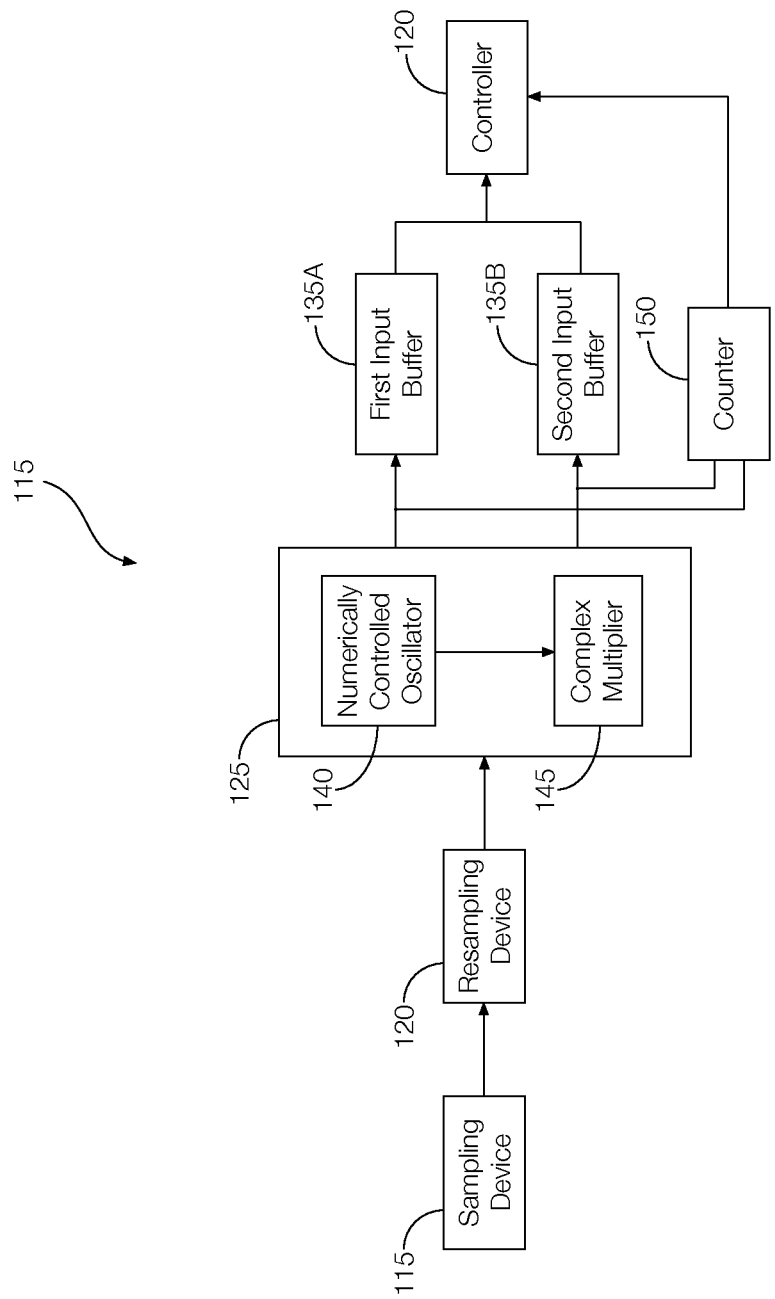
FIG. 2 is a block diagram showing example components of the receiver of FIG. 1.

FIG. 2 is a block diagram showing example components of the satellite receiver 110. As shown, the satellite receiver 110 includes a sampling device 115, a resampling device 120, an incremental phase modulator 125, a controller 130, and a buffer 135.

The sampling device 115 may include any number of electronic devices programmed to sample the satellite signal according to a first chip rate. In one possible implementation, the sampling device 115 may initially sample the satellite signal. As discussed above, the satellite signal may be initially sampled according to a first chip rate. For example, the sampling device 115 may initially sample the satellite signal at eight times the chip rate. In some instances, the sampling device 115 may determine the Doppler frequency of the sampled satellite signal. The initial Doppler frequency may be based on a fast Fourier transform operation applied to the satellite signal. The sampling device 115 may be programmed to output the sampled satellite signal.

The resampling device 120 may include any number of electronic devices programmed to sample the sampled satellite signal output by the sampling device 115. The resampling device 120 may sample the sampled satellite signal according to a second chip rate, which may be lower than the first chip rate. In the example provided above the satellite signal may be initially sampled at eight times the chip rate. The sampled satellite signal may be sampled at, e.g., two times the chip rate. Thus, the first chip rate may be four times greater than the second chip rate. The resampling device 120 may be programmed to output the resampled satellite signal to, e.g., the incremental phase modulator 125.

The incremental phase modulator 125 may include any number of electronic devices programmed to filter a frequency offset from the resampled satellite signal. As shown in FIG. 2, the incremental phase modulator 125 includes a numerically controlled oscillator 140 and a complex multiplier 145. The numerically controlled oscillator 140 may be configured or programmed to output signals to the complex multiplier 145. The signals output by the numerically controlled oscillator 140 may represent a waveform, such as a sinusoidal waveform. The waveform may relate to the Doppler frequency determined by the sampling device 115 as a result of initially sampling the satellite signal. In one possible approach, the numerically controlled oscillator 140 may include, e.g., a phase accumulator and a phase-to-amplitude converter. The complex multiplier 145 may be configured or programmed to receive the waveform output by the numerically controlled oscillator 140 as well as the resampled satellite signal output by the resampling device 120. The complex multiplier 145 may apply the waveform, which as discussed above may relate to the Doppler frequency of the initial satellite signal, to the resampled satellite signal to filter the frequency offset. The complex multiplier 145 may output a filtered satellite signal, which may include the resampled satellite signal independent of the frequency offset. The filtered satellite signal may further operate as the output of the incremental phase modulator 125.

The controller 130 may include any number of electronic devices programmed to receive and process the filtered satellite signal output by the incremental phase modulator 125. In one possible approach, the controller 130 may be programmed to receive the filtered satellite signal directly from the complex multiplier 145. In another implementation, the controller 130 may access the filtered satellite signal from the buffer 135, as described in greater detail below. The controller 130 may estimate the Doppler frequency associated with the filtered satellite signal by, e.g., performing a fast Fourier transform operation on the filtered satellite signal. The resulting Doppler frequency may be more accurate than the Doppler frequency initially determined by the sampling device 115.

The buffer 135 may include any number of electronic devices configured or programmed to store data in digital form. The buffer 135 may include a first input buffer 135A and a second input buffer 135B. The incremental phase modulator 125 may be programmed to output the filtered satellite signal to the first input buffer 135A or the second input buffer 135B. When one buffer 135 becomes full, the controller 130 may be programmed to access the buffer 135 and process the data stored in that buffer 135. While the controller 130 is processing the data in one buffer 135, the incremental phase modulator 125 may store data in the other buffer 135. A counter 150 may be employed to track how much data is stored in each of the buffers 135, and the counter 150 may be reset once the data in one of the buffers 135 has been accessed. The controller 130 may compare the count kept by the counter 150 to a predetermined value based on, e.g., the amount of data each buffer 135 can hold. When the count reaches the predetermined value, the controller 130 may access the data stored in one of the buffers 135. By using multiple buffers 135, the controller 130 may process the entire filtered satellite signal.

Figure 3:
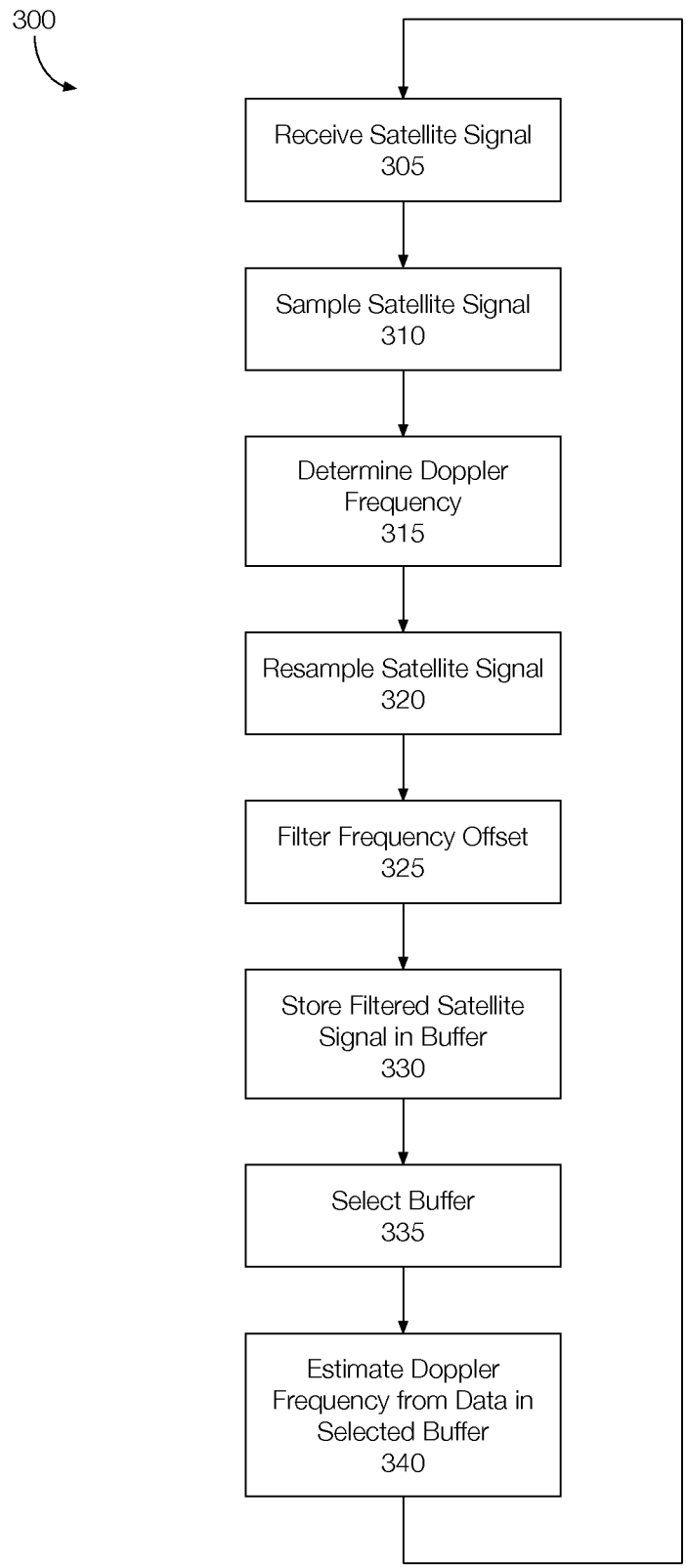
FIG. 3 is a flowchart of an example process that may be executed by the receiver to compensate for a Doppler effect caused by the movement of the satellite relative to the receiver.

FIG. 3 is a flowchart of an example process 300 that may be executed by the satellite receiver 110 to compensate for a Doppler effect caused by the movement of the satellite 105 relative to the satellite receiver 110. The process 300 may be initiated when the satellite receiver 110 is turned on and may continue to execute until the satellite receiver 110 is turned off.

At block 305, the satellite receiver 110 may receive a satellite signal. The satellite signal may be transmitted by a satellite 105 in, e.g., a low Earth orbit. The satellite signal may be transmitted and received in accordance with a telecommunications protocol such as, e.g., the code division multiple access (CDMA) standard.

At block 310, the satellite receiver 110 may sample the satellite signal. The satellite signal may be sampled by, e.g., the sampling device 115. As discussed above, the satellite signal may be initially sampled according to a first chip rate. For example, the sampling device 115 may initially sample the satellite signal at eight times the chip rate.

At block 315, the satellite receiver 110 may determine the Doppler frequency of the sampled satellite signal. The initial Doppler frequency may be based on a fast Fourier transform operation applied to the satellite signal. The sampling device 115 may be used to determine the initial Doppler frequency.

At block 320, the satellite receiver 110 may resample the satellite signal. That is, the resampling device 120 may sample the sampled satellite signal output by the sampling device 115. The resampling device 120 may sample the sampled satellite signal according to a second chip rate, which may be lower than the first chip rate. In the example provided above the satellite signal may be initially sampled at eight times the chip rate. The sampled satellite signal may be sampled at, e.g., two times the chip rate. Thus, the first chip rate may be four times greater than the second chip rate.

At block 325, the satellite receiver 110 may filter a frequency offset from the resampled satellite signal. The resampled satellite signal may be filtered by, e.g., the incremental phase modulator 125. As discussed above, the incremental phase modulator 125 may include a numerically controlled oscillator 140 and a complex multiplier 145. The signals output by the numerically controlled oscillator 140 may represent a sinusoidal waveform relating to the Doppler frequency determined by the sampling device 115 as a result of initially sampling the satellite signal at block 315. The complex multiplier 145 may apply the waveform output by the numerically controlled oscillator 140 to the resampled satellite signal to filter the frequency offset.

At block 330, the satellite receiver 110 may store the filtered satellite signal in a buffer 135. The buffer 135, as discussed above, may include a first input buffer 135A and a second input buffer 135B. The incremental phase modulator 125 may store the filtered satellite signal in the first input buffer 135A or the second input buffer 135B, depending on which is currently being accessed by the controller 130. Storing the filtered satellite signal in the buffer 135 may include incrementing the counter 150 so that the counter 150 may track how much data is stored in each buffer 135.

At block 335, the satellite receiver 110 may select which buffer 135 to access. For example, the controller 130 may compare the count kept by the counter 150 to a predetermined value. As discussed above, the predetermined value may relate to the amount of data each buffer 135 can hold. If the count for the first input buffer 135A is equal to the predetermined value, the controller 130 may determine that the first input buffer 135A is full, meaning that the data stored in the first input buffer 135A is ready for processing. Alternatively, if the count for the second input buffer 135B is equal to the predetermined value, the controller 130 may determine that the second input buffer 135B is full, meaning that the data stored in the second input buffer 135B is ready for processing. While one buffer 135 is being accessed and processed, data may be stored in the other buffer 135 until the count reaches the predetermined value.

At block 340, the satellite receiver 110 may process the data stored in one of the buffers 135 to estimate the Doppler frequency associated with the satellite signal. For instance, the controller 130 may process the data stored in the first input buffer 135A or the second input buffer 135B. The data may include, e.g., the filtered satellite signal. The controller 130 may output the estimated Doppler frequency.

The process 300 may end after block 340. Alternatively, the process 300 may continue at block 305 so that the process 300 may continue to execute until the satellite receiver 110 is turned off.

The telecommunications system 100 described above is able to more accurately estimate the Doppler frequency associated with a satellite signal. Accordingly, the satellite signal can be processed more accurately, which may result in higher quality video and audio output.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a set top box, a media content processing device, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A telecommunications system comprising:
a satellite receiver programmed to estimate a Doppler frequency associated with a satellite signal, wherein estimating the Doppler frequency includes sampling the satellite signal, sampling the sampled satellite signal, and compensating for a frequency offset associated with the satellite signal,
wherein the satellite receiver includes a controller and an incremental phase modulator programmed to filter the resampled satellite signal to compensate for the frequency offset and output a filtered satellite signal,
wherein the satellite receiver includes a first buffer and a second buffer, and wherein the incremental phase modulator is programmed to store the filtered satellite signal in at least one of the first buffer and the second buffer,
wherein the incremental phase modulator is programmed to determine that the controller is accessing the first buffer and select the second buffer for storing the filtered satellite signal as a result of determining that the controller is accessing the first buffer.

2. The telecommunications system of claim 1, wherein the satellite receiver includes a sampling device programmed to sample the satellite signal.

3. The telecommunications system of claim 1, wherein the satellite receiver includes a resampling device programmed to sample the satellite signal and output a resampled satellite signal.

4. The telecommunications system of claim 3, wherein the resampling device is programmed to sample the satellite signal according to a predetermined chip rate.

5. The telecommunications system of claim 3, wherein the resampling device is programed to reduce a chip rate from a first chip rate to a second chip rate.

6. The telecommunications system of claim 5, wherein the first chip rate is at least four times greater than the second chip rate.

7. The telecommunications system of claim 1, wherein the incremental phase modulator includes at least one of a numerically controlled oscillator and a complex multiplier.

8. The telecommunications system of claim 1, wherein the controller is programmed to receive and process the filtered satellite signal.

9. The telecommunications system of claim 8, wherein the controller is programmed to estimate the Doppler frequency associated with the satellite signal based at least in part on the filtered satellite signal output by the incremental phase modulator.

10. The telecommunications system of claim 1, wherein the satellite receiver includes a counter programmed to track how an amount of data stored in at least one of the first buffer and the second buffer.

11. The telecommunications system of claim 10, wherein the controller is programmed to compare the amount of data stored in the first buffer as determined by the counter, determine that the amount of data stored in the first buffer has reached a predetermined threshold, and access the first buffer as a result of determining that the amount of data in the first buffer has reached the predetermined threshold.

12. A satellite receiver comprising:
a sampling device programmed to sample the satellite signal;
a resampling device programmed to sample the sampled satellite signal and output a resampled satellite signal;
a first buffer;
a second buffer;
a controller programmed to access the first buffer and the second buffer at different times; and
an incremental phase modulator programmed to filter a frequency offset from the resampled satellite signal and output a filtered satellite signal and store the filtered satellite signal in at least one of the first buffer and the second buffer,
wherein the incremental phase modulator is further programmed to determine that the controller is accessing the first buffer and select the second buffer for storing the filtered satellite signal as a result of determining that the controller is accessing the first buffer.

13. The satellite receiver of claim 12, wherein the resampling device is programmed to sample the satellite signal according to a predetermined chip rate.

14. The satellite receiver of claim 12, wherein the resampling device is programed to reduce a chip rate from a first chip rate to a second chip rate.

15. The satellite receiver of claim 14, wherein the first chip rate is at least four times greater than the second chip rate.

16. The satellite receiver of claim 12, wherein the incremental phase modulator includes at least one of a numerically controlled oscillator and a complex multiplier.

17. The satellite receiver of claim 16, wherein the resampling device is programmed to output the resampled satellite signal to the complex multiplier.

18. The satellite receiver of claim 16, wherein the complex multiplier is programmed to output a filtered satellite signal, the filtered satellite signal including the resampled satellite signal independent of the frequency offset.

19. The satellite receiver of claim 12, the controller is programmed to receive and process the filtered satellite signal output by the incremental phase modulator.

20. The satellite receiver of claim 19, wherein the controller is programmed to estimate the Doppler frequency associated with the satellite signal based at least in part on the filtered satellite signal output by the incremental phase modulator.

* * * * *